US008365987B2

(12) United States Patent
Jackman et al.

(10) Patent No.: US 8,365,987 B2
(45) Date of Patent: Feb. 5, 2013

(54) PRE-ALLOCATED NEGOTIABLE INSTRUMENT AND PRESENTATION INSTRUMENT PURCHASING AND ACTIVATION SYSTEMS AND METHODS

(75) Inventors: Richard Jackman, Collierville, TN (US); Mark Herrington, Memphis, TN (US); Mark V. Putman, Memphis, TN (US)

(73) Assignee: Money Network Financial, LLC, Cordova, TN (US)

( * ) Notice: Subject to any disclaimer, the term of this patent is extended or adjusted under 35 U.S.C. 154(b) by 516 days.

(21) Appl. No.: 11/843,395

(22) Filed: Aug. 22, 2007

(65) Prior Publication Data

US 2008/0067241 A1 Mar. 20, 2008

Related U.S. Application Data

(60) Provisional application No. 60/839,843, filed on Aug. 23, 2006.

(51) Int. Cl.
*G06K 5/00* (2006.01)
*G06Q 40/00* (2012.01)

(52) U.S. Cl. .......................................... 235/380; 705/45

(58) Field of Classification Search .................. 235/375, 235/379, 380, 381; 283/67; 382/115, 116, 382/137, 138, 139; 705/39, 41, 72, 75, 45
See application file for complete search history.

(56) References Cited

U.S. PATENT DOCUMENTS

| | | | |
|---|---|---|---|
| 4,256,955 A | | 3/1981 | Giraud et al. |
| 4,321,672 A | | 3/1982 | Braun et al. |
| 4,385,285 A | * | 5/1983 | Horst et al. ................... 382/119 |
| 4,700,055 A | | 10/1987 | Kashkashian, Jr. |
| 4,837,422 A | * | 6/1989 | Dethloff et al. ............... 235/380 |
| 4,900,903 A | | 2/1990 | Wright et al. |
| 5,023,782 A | * | 6/1991 | Lutz et al. ....................... 705/45 |
| 5,155,342 A | | 10/1992 | Urano |
| 5,231,569 A | | 7/1993 | Myatt et al. |
| 5,393,963 A | | 2/1995 | Thomas et al. |
| 5,457,305 A | | 10/1995 | Akel et al. |
| 5,483,445 A | | 1/1996 | Pickering |
| 5,500,513 A | | 3/1996 | Langhans et al. |
| 5,513,102 A | | 4/1996 | Auriemma |
| 5,537,314 A | | 7/1996 | Kanter |
| 5,546,523 A | | 8/1996 | Gatto |
| 5,590,038 A | | 12/1996 | Pitroda |
| 5,613,012 A | | 3/1997 | Hoffman et al. |

(Continued)

FOREIGN PATENT DOCUMENTS

| EP | 0 540 234 A2 | 5/1993 |
|---|---|---|
| EP | 0 725 376 A2 | 8/1996 |

(Continued)

OTHER PUBLICATIONS

United States Postal Service, Notice 299, "US Postal Money Order Reference Card", Jun. 2003.*

(Continued)

*Primary Examiner* — Thien M Le
*Assistant Examiner* — Toan Ly
(74) *Attorney, Agent, or Firm* — Kilpatrick Townsend & Stockton LLP

(57) ABSTRACT

A presentation instrument package includes a presentation instrument and a negotiable instrument. The package is configured for display at a point-of-sale, and the presentation instrument and negotiable instrument are configured for activation at the point-of-sale.

16 Claims, 6 Drawing Sheets

U.S. PATENT DOCUMENTS

| | | | |
|---|---|---|---|
| 5,614,703 | A | 3/1997 | Martin et al. |
| 5,621,640 | A | 4/1997 | Burke |
| 5,649,117 | A | 7/1997 | Landry |
| 5,650,604 | A | 7/1997 | Marcous et al. |
| 5,684,965 | A | 11/1997 | Pickering |
| 5,770,843 | A | 6/1998 | Rose et al. |
| 5,777,305 | A * | 7/1998 | Smith et al. .................. 235/380 |
| 5,783,808 | A | 7/1998 | Josephson |
| 5,826,243 | A | 10/1998 | Musmanno et al. |
| 5,859,419 | A | 1/1999 | Wynn |
| 5,863,073 | A * | 1/1999 | Taskett ............................ 283/58 |
| 5,864,830 | A | 1/1999 | Armetta et al. |
| 5,873,072 | A | 2/1999 | Kight et al. |
| 5,897,625 | A | 4/1999 | Gustin et al. |
| 5,914,472 | A | 6/1999 | Foladare et al. |
| 5,920,847 | A | 7/1999 | Kolling et al. |
| 5,943,656 | A | 8/1999 | Crooks et al. |
| 5,953,710 | A | 9/1999 | Fleming |
| 5,970,480 | A | 10/1999 | Kalina |
| 5,978,780 | A | 11/1999 | Watson |
| 5,999,596 | A | 12/1999 | Walker et al. |
| 5,999,624 | A | 12/1999 | Hopkins |
| 6,012,048 | A | 1/2000 | Gustin et al. |
| 6,021,943 | A | 2/2000 | Chastain |
| 6,035,285 | A | 3/2000 | Schlect et al. |
| 6,044,360 | A | 3/2000 | Picciallo |
| 6,049,782 | A | 4/2000 | Gottesman et al. |
| 6,081,790 | A | 6/2000 | Rosen |
| 6,108,641 | A | 8/2000 | Kenna et al. |
| 6,128,599 | A | 10/2000 | Walker et al. |
| 6,128,602 | A | 10/2000 | Northington et al. |
| 6,128,603 | A | 10/2000 | Dent et al. |
| 6,226,623 | B1 | 5/2001 | Schein et al. |
| 6,292,789 | B1 | 9/2001 | Schutzer |
| 6,304,860 | B1 | 10/2001 | Martin, Jr. et al. |
| 6,311,170 | B1 | 10/2001 | Embrey |
| 6,327,577 | B1 | 12/2001 | Garrison et al. |
| 6,422,462 | B1 | 7/2002 | Cohen |
| 6,626,357 | B1 * | 9/2003 | Ross ............................... 235/379 |
| 6,829,588 | B1 | 12/2004 | Stoutenburg et al. |
| 7,050,996 | B1 | 5/2006 | Blagg et al. |
| 7,076,465 | B1 | 7/2006 | Blagg et al. |
| 7,275,683 | B2 * | 10/2007 | Lazarowicz et al. ........... 235/375 |
| 7,401,731 | B1 * | 7/2008 | Pletz et al. .................... 235/380 |
| 2002/0053378 | A1 * | 5/2002 | Gribovsky .................... 150/132 |
| 2002/0100797 | A1 * | 8/2002 | Hollingsworth et al. ..... 229/92.8 |
| 2002/0138424 | A1 * | 9/2002 | Coyle .............................. 705/39 |
| 2002/0156683 | A1 | 10/2002 | Stoutenburg et al. |
| 2002/0185855 | A1 * | 12/2002 | Klure .............................. 283/62 |
| 2003/0004889 | A1 * | 1/2003 | Fiala et al. ...................... 705/64 |
| 2003/0093368 | A1 | 5/2003 | Manfre et al. |
| 2004/0030607 | A1 | 2/2004 | Gibson |
| 2004/0206640 | A1 * | 10/2004 | Frenkel ......................... 206/232 |
| 2005/0035192 | A1 * | 2/2005 | Bonalle et al. ................ 235/379 |
| 2005/0075974 | A1 | 4/2005 | Turgeon |
| 2005/0116027 | A1 | 6/2005 | Algiene et al. |
| 2005/0199705 | A1 * | 9/2005 | Beck et al. .................... 235/380 |
| 2006/0006224 | A1 | 1/2006 | Modi |
| 2006/0074765 | A1 | 4/2006 | Crawford et al. |
| 2007/0057035 | A1 | 3/2007 | Jackman et al. |
| 2008/0215488 | A1 | 9/2008 | Jackman et al. |

FOREIGN PATENT DOCUMENTS

| | | |
|---|---|---|
| WO | WO 97/43893 A1 | 11/1997 |

OTHER PUBLICATIONS

Air Miles Service Center, "Terms & Conditions of the Air Miles® Reward Program," 1 page, May 1998.

Andrejczak, Matt, "Va. Bank Aims to Gain Accounts Through Pact With Debit Card Issuer," American Banker, vol. 164, No. 93, 2 pages, May 17, 1999.

Barish, William, "Debit Cards: A Personal Perspective," www.americanpayroll.org, pp. 18-20, Apr. 2002.

Brockman, Todd J., "Card-Based Payroll Solutions," www.americanpayroll.org, pp. 22-23, Apr. 2002.

Comdata Corporation, "Payroll & Electronic Funds Distribution Solutions: Eliminate the High-Cost of Paper Payroll Distribution," 1 page, 2006.

First Data Corp., "Tran$Pay Soon to Be the Western Union Pay Card," 1 page, no date.

Green, Lisbeth K., "Payroll Cards: How and Why to Make Them Work for Your Organization," www.americanpayroll.org, pp. 16-17 and 24, Apr. 2002.

IPS Card Solutions, Inc., "FDX-400 Remote Payroll Distribution," 1 page, 1998.

McEnaney, Maura, "Modular ATM Gives Boost to Diebold," Akron Beacon Journal, 3 pages, Jul. 12, 1997.

White, Ron, "How Computers Work," Fourth Edition, 38 pages, Sep. 1998.

* cited by examiner

PRE-ALLOCATED NEGOTIABLE INSTRUMENT AND PRESENTATION INSTRUMENT PURCHASING AND ACTIVATION SYSTEMS AND METHODS

CROSS-REFERENCES TO RELATED APPLICATIONS

This application is a non-provisional, and claims the benefit, of commonly assigned, U.S. Provisional Application No. 60/839,843, filed Aug. 23, 2006, entitled "Pre-Allocated Negotiable Instrument And Presentation Instrument Purchasing And Activation Systems And Methods," the entirety of which is herein incorporated by reference for all purposes.

This application is related to co-pending, commonly-assigned U.S. patent application Ser. No. 11/223,441, filed Sep. 9, 2005, entitled "Enhanced Pre-Allocated Check Negotiability Systems And Methods," and U.S. patent application Ser. No. 11/834,457, filed Aug. 6, 2007, entitled "Payor-Based Account Porting To Portable Value Distribution Systems and Methods," which is a non-provisional, and claims the benefit, of U.S. Provisional Application No. 60/821,485, filed Aug. 4, 2006, entitled "Employer-Based Account Porting To Portable Payroll Card Systems And Methods," the entirety of each of which are herein incorporated by reference for all purposes.

FIELD OF THE INVENTION

Embodiments of the present invention relate generally to non-cash currency. More specifically, embodiments of the present invention relate packaging, displaying, purchasing, and activating pre-allocated negotiable instruments and presentation instruments.

BACKGROUND OF THE INVENTION

Some estimates indicate that fifty-six million (56,000,000) workers in the U.S. do not have a traditional banking relationship. But these "unbanked" individuals nevertheless need to function in a society heavily dependent on efficient financial transactions. This is becoming increasingly difficult to accomplish using cash as the medium of monetary exchange. Hence, systems and methods are needed that allow unbanked individuals to complete financial transactions more efficiently.

BRIEF SUMMARY OF THE INVENTION

Embodiments of the invention provide a presentation instrument package. The package includes a presentation instrument and a negotiable instrument. The package is configured for display at a point-of-sale, and the presentation instrument and negotiable instrument are configured for activation at the point-of-sale.

In some embodiments the presentation instrument is a debit card. The negotiable instrument may be a fund on issue negotiable instrument for which funds are allocated to the negotiable instrument upon the customer's request prior to the customer presenting the negotiable instrument for settlement of a transaction. The package may include packaging having instructions printed thereon for activating an account associated with the presentation instrument and the negotiable instrument. The account comprises may be a stored value account (SVA), demand deposit account (DDA), a negotiable order of withdrawal account (NOW), a for the benefit of account (FBO), or the like.

Other embodiments provide a method of creating an account for a customer. The method includes creating an account, providing a presentation instrument relating to the account, providing a fund on issue negotiable instrument relating to the account, packaging the presentation instrument and fund on issue negotiable instrument for display at a retail location, and upon request from a customer at the retail location, activating the account using a point-of-sale device by associating a customer-specified amount of funds with the account. The customer tenders the amount of funds at the retail location.

In some embodiments, the account is a stored value account (SVA), a demand deposit account (DDA), a negotiable order of withdrawal account (NOW), a for the benefit of account (FBO), or the like. The fund on issue negotiable instrument may be a negotiable instrument for which funds are allocated to the negotiable instrument upon the customer's request prior to the customer presenting the negotiable instrument for settlement of a transaction. The presentation instrument may be a debit card. The method may include thereafter receiving a request from the customer to upgrade the presentation instrument to a personalized presentation instrument. The method also may include receiving a request from the customer to allocate a portion of the amount of funds to the negotiable instrument, and in response to the request, allocating the funds to the negotiable instrument, thereby preventing the funds from being used to settle a transaction not involving the negotiable instrument. The method also may include, in response to a request to settle a transaction using the negotiable instrument, confirming that funds are available to settle the transaction, and authorizing the transaction. The method also may include, in response to a request to settle a transaction not using the negotiable instrument, confirming that funds are available to settle the transaction, and denying the transaction.

Still other embodiments provide a method of completing a purchase transaction. The method includes, at a point-of-sale, receiving a request from a customer to activate an account. The request identifies an activation amount of funds to associate with the account. The method also includes using a point-of-sale device to send an account identifier and the activation amount of funds to a host computer system. The method further includes creating a record at the host computer system. The record identifies the activation amount of funds. The method also includes, at the point-of-sale, competing a transaction with the customer in which transaction the consumer purchases a package that includes a presentation instrument and at least one negotiable document relating to the account. The method further includes receiving a request at the host computer system to allocate an allocation amount of funds from the account to the at least one negotiable document. The method also includes confirming that the allocation amount of funds is less than a current balance of funds. The method further includes allocating the allocation amount of funds to the at least one negotiable document, providing a transaction number in response to the request to allocate funds, and receiving a request from a merchant to authorize a transaction using the at least one negotiable document. The request includes a transaction amount of funds. The method further includes comparing the allocation amount of funds to the transaction amount of funds, and, based on the comparison, authorizing the transaction.

The presentation instrument may be a debit card. The negotiable document may be a fund on issue negotiable instrument for which funds are allocated to the negotiable instrument upon the customer's request prior to the customer presenting the negotiable instrument for settlement of a transaction. The account may be a stored value account (SVA), a demand deposit account (DDA), a negotiable order of withdrawal account (NOW), a for the benefit of account (FBO), or the like. The method may include thereafter receiving a request from the customer to upgrade the presentation instrument to a personalized presentation instrument.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
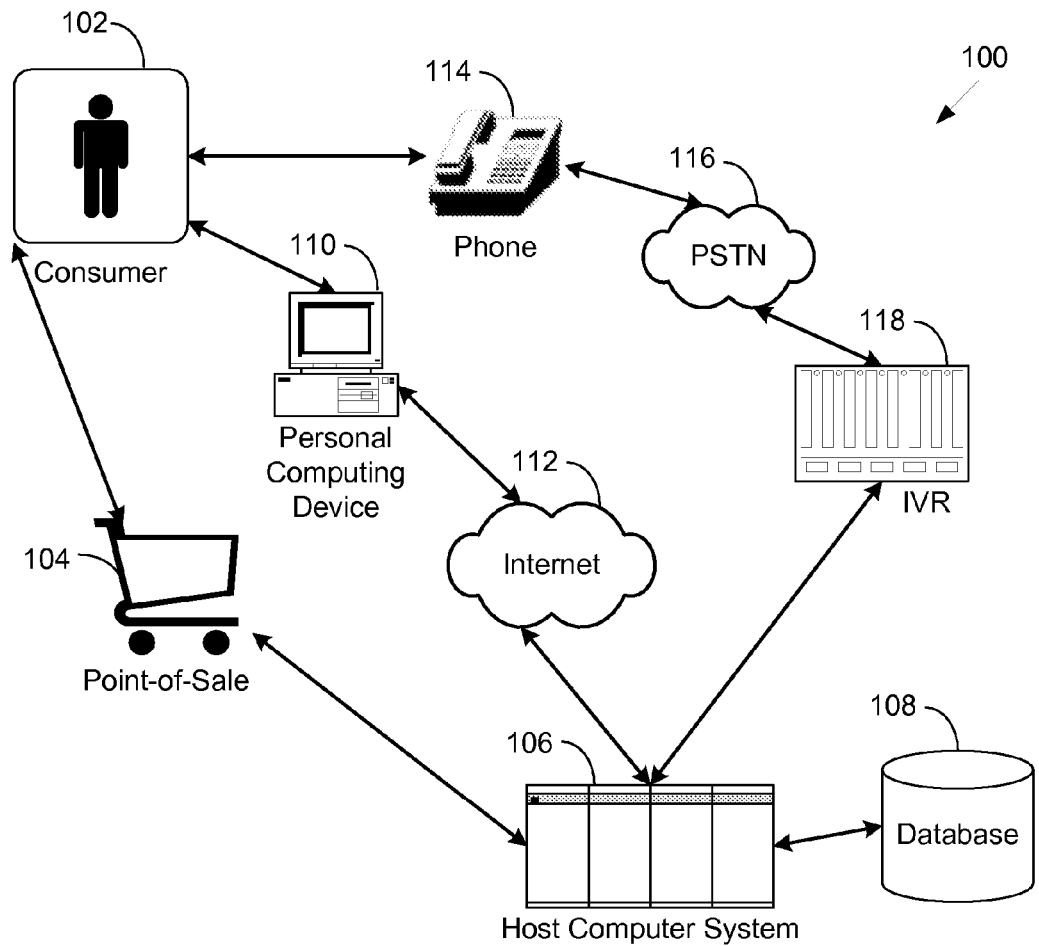
FIG. 1A illustrates an exemplary bounceless banking system according to embodiments of the invention.

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention as set forth in the appended claims.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may be a component of a larger system, wherein other procedures may take precedence over or otherwise modify their application. Also, a number of steps may be required before, after, or concurrently with the following systems, methods, or software.

According to embodiments of the invention, a consumer (herein also, "customer," "account holder," "card holder," etc.) purchases a package at a point-of-sale (e.g., retail location, bank, check cashing service provider, etc.). The package includes a presentation instrument (e.g., debit card, stored value card, RFID card or object, etc.) and may include one or more negotiable documents (e.g., negotiable instrument, check, etc.). The consumer presents the package for purchase to a merchant (herein also, "owner," "site operator," etc.) associated with the point-of-sale, and requests activation of an associated account. The consumer provides an amount of funds (activation amount) to the merchant to activate the account. Using a point-of-sale device at the merchant location, the merchant activates the account by communicating with a host computer system at which an account record is created. The account record includes an account number that relates to the presentation instrument and also includes the activation amount of funds.

The negotiable instrument may be a "fund on issue" negotiable instrument. A fund on issue negotiable instrument is a negotiable instrument in which funds are associated with the negotiable instrument prior to the negotiable instrument being presented to settle a purchase transaction. According to embodiments of the present invention, the fund on issue negotiable instrument may have funds associated with it upon the customer's request, as will be described in greater detail hereinafter.

In some embodiments, the presentation instrument is immediately available for use at any location that accepts the particular presentation instrument, including ATM locations. In other embodiments, the consumer may be required to contact the host computer system, via an IVR, web site, operator, and/or the like, to provide additional information to activate the presentation instrument. In embodiments in which one or more negotiable documents are included in the package purchased by the consumer, the consumer may need to contact the host to allocate funds to the negotiable document prior to their use. In such embodiments, the consumer identifies an allocation amount of funds for a particular negotiable document. If that amount of funds is available, the host computer allocates the funds to the negotiable document and provides the consumer with a transaction number, which may be entered on the negotiable document.

Once an allocation amount of funds are allocated to a negotiable document, the consumer may present the negotiable document to a merchant to settle a transaction. The merchant then contacts the host computer, via a point-of-sale device, IVR, and/or the like, to authorize the transaction. The merchant identifies a transaction amount of funds to the host, which transaction amount is the amount of funds identified on the negotiable document. The host compares the transaction amount to ensure that the transaction amount matches, or at least does not exceed, the allocation amount. Provided this is the case, the host authorizes the transaction. The transaction thereafter may be settled as negotiable document transactions typically are settled. In such embodiments, however, the negotiable document will not "bounce" because the funds have been pre-allocated and authorized, thereby preventing them from being made available to settle other transactions. In other words, the negotiable document may be a "fund on issue" negotiable document since funds are allocated to the negotiable document prior to the negotiable document being presented to settle a transaction, in this case, at the time a customer requests funds to be allocated to the negotiable document.

In some embodiments, the consumer is able to enhance the features of the account to accept additional funds (i.e., reload the account). This may require providing additional personal information to the host via an IVR, web site, operator, and/or the like. Thereafter, the consumer may load additional funds himself and/or provide information to a third party (e.g., an employer, parent, caretaker, and/or the like), which information may be used by the third party to load additional funds to the consumer's account.

Figure 3A:
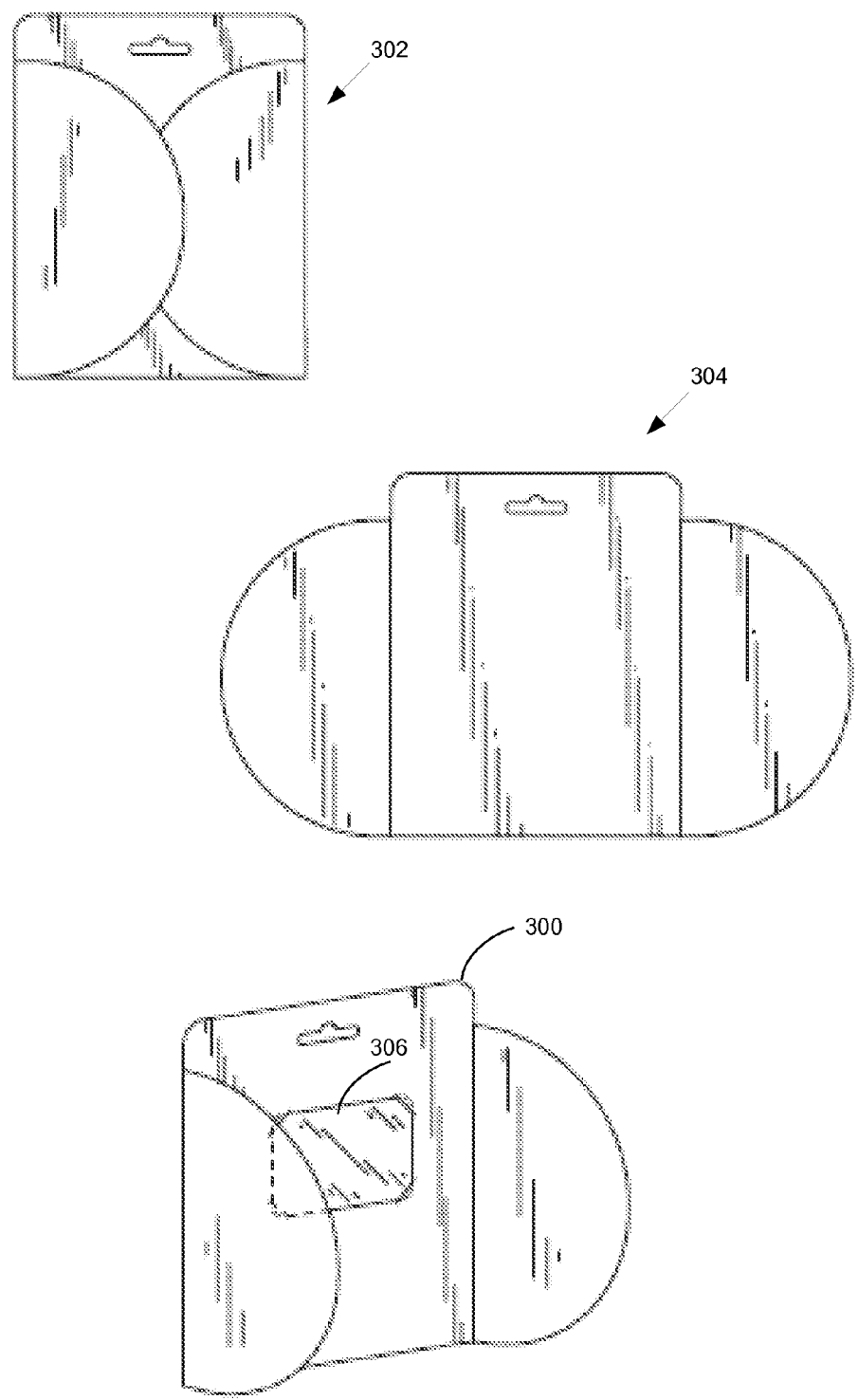
FIGS. 3A-3C depict exemplary presentation instrument packages according to embodiments of the invention, which packages may include one or more fund on issue negotiable instruments.
Figure 3B:
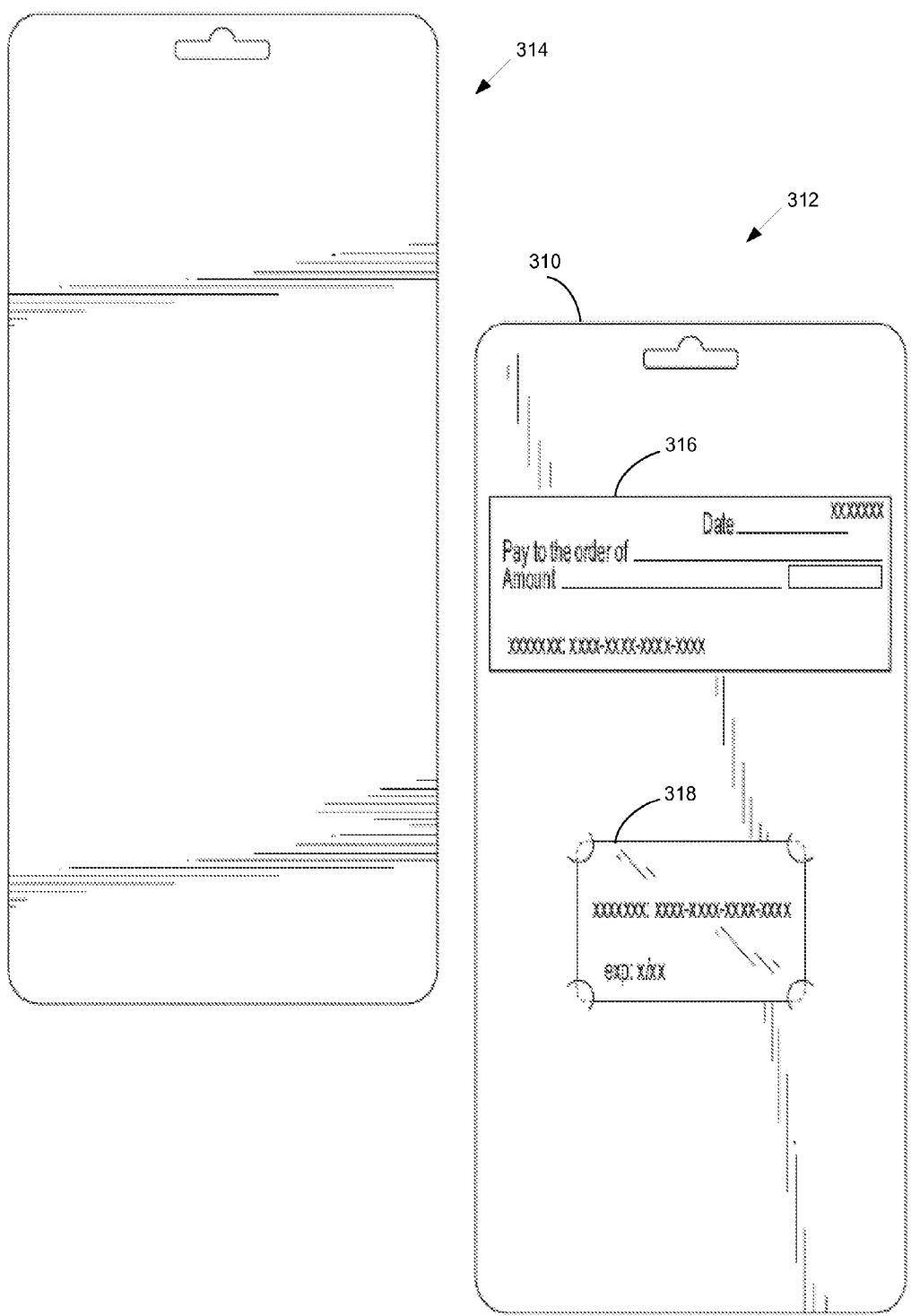
Figure 3C:
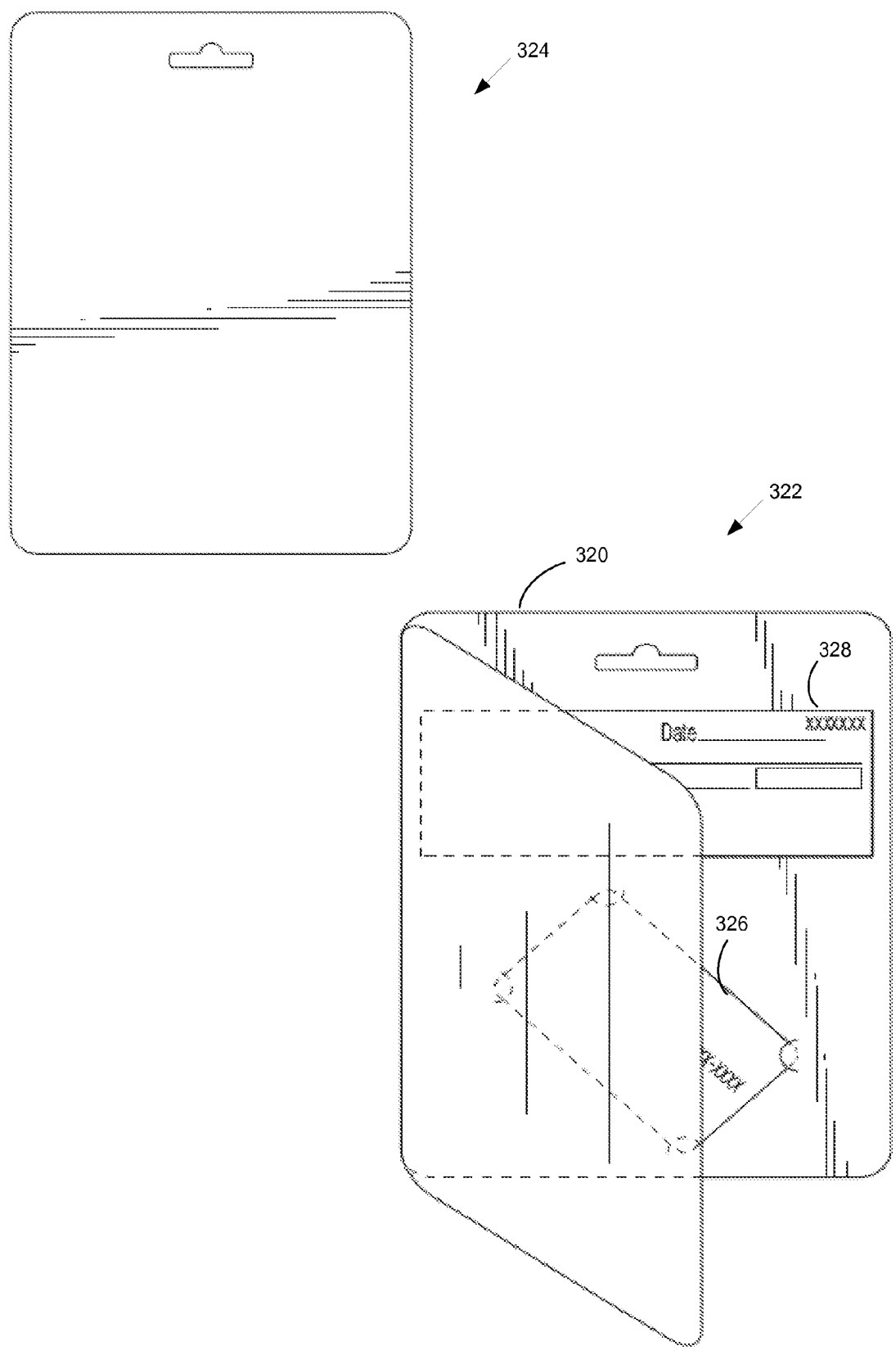

Having described embodiments of the invention generally, attention is directed to FIG. 1A, which illustrates an exemplary system 100 which may include embodiments of the invention. In this exemplary system 100, a consumer 102 selects a package for purchase at a point of sale 104. The package includes a presentation instrument and may include one or more negotiable documents. FIGS. 3A-3C depict exemplary packaging arrangements.

An account associated with the presentation instrument (and negotiable documents, in such embodiments) is activated at the point of sale, typically using a point-of-sale device or other appropriate communication means (IVR, web site, etc.), by interacting with a host computer system 106. The host 106 creates a record in an associated database, which record includes an account identifier associated with the presentation instrument. A portion of the account identifier may be pre-embossed on the presentation instrument. Additionally, an record associated with the presentation instrument may pre-exist at the database 106. In any case, the process of activating the presentation instrument includes identifying an activation amount of funds, which amount of funds the consumer provides to the merchant. Typically the amount of funds tendered by the consumer to the merchant must be in cash or cash equivalent. The record then includes the activation amount of funds, which may be considered the "account balance."

Thereafter, the presentation instrument may be available for use by the consumer at locations that accept the presentation instrument. In some embodiments, however, the consumer must take additional steps to activate the presentation instrument. Such further steps may include contacting the host 106 via a personal computer 110, or other suitable computing or communication device, via the Internet 112, and interacting through a web site. The consumer provides additional personal information needed, in such embodiments, to activate the account. In some embodiments the consumer contacts the host using a phone 114 and PSTN 116 (Public Switched Telephone Network), to contact an IVR 118. The IVR 118 interacts with the host to incorporate the required personal information into the record.

By providing the additional personal information, the consumer may "upgrade" the account from a stored value account (SVA) to a demand deposit account (DDA), which will be understood herein to include a "General Spend Card Account." The DDA account then may be configured to receive "reload" funds from the consumer and/or third parties. Upgrading the account may initiate a process for creating a personalized presentation instrument (e.g., embossed with the consumer's name) for the consumer and/or providing negotiable documents to the consumer if such negotiable documents were not included in the package initially purchased by the consumer.

Whether included in the initial package purchased by the consumer or provided to the consumer subsequently, the consumer may allocate funds to a particular negotiable instrument by contacting the host 106 using the aforementioned means. When allocating funds to the negotiable instrument, the consumer provides an allocation amount to the host 106, and, provided the allocation amount of funds is available, the host allocates the funds to the negotiable instrument, thereby preventing the funds from being used for other transactions. The host then may provide a transaction number to the consumer for entry onto the negotiable instrument.

Figure 1B:
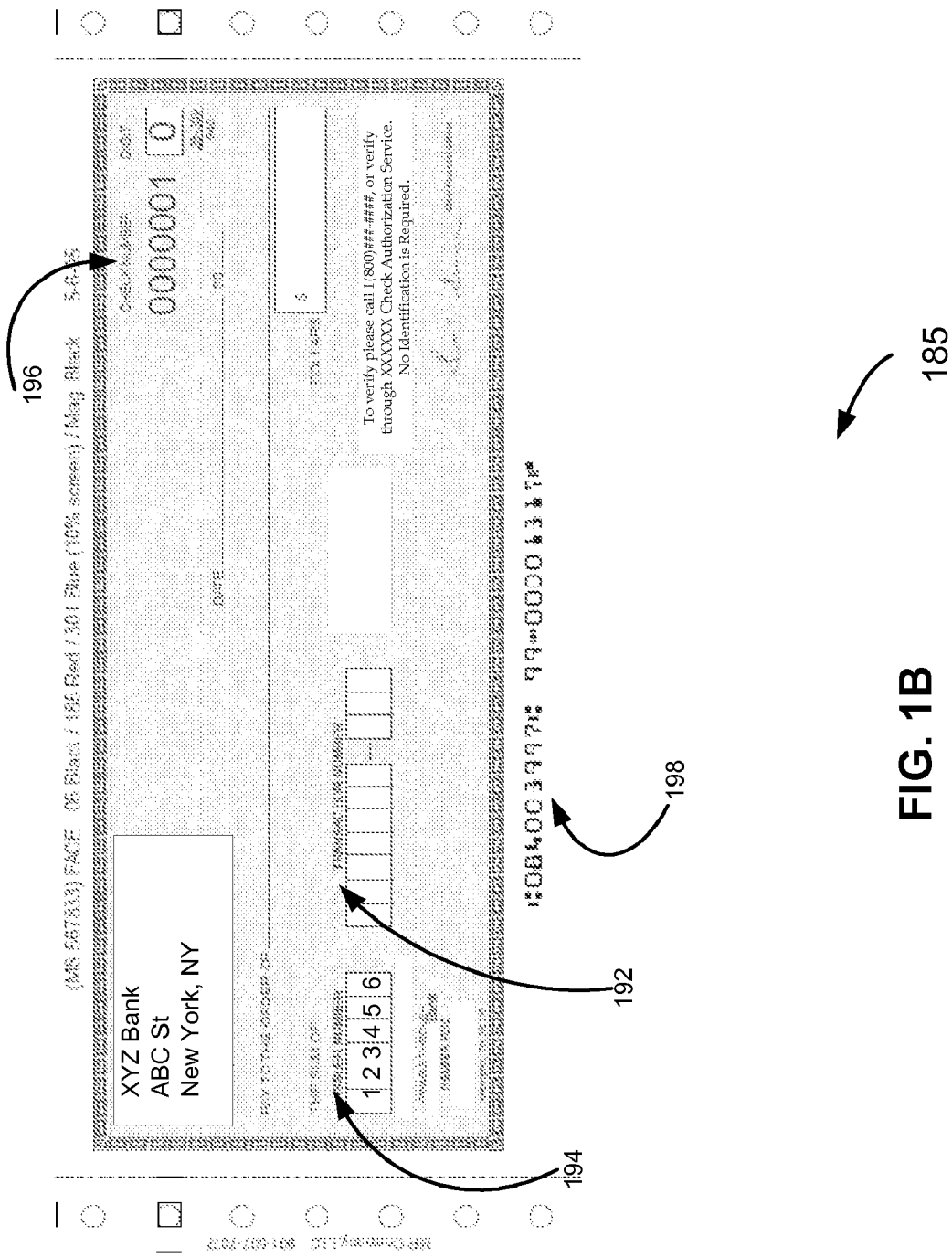
FIG. 1B is a representative image of an exemplary negotiable instrument which may be used according to various embodiments of the present invention.

An example of such a negotiable instrument 185 is illustrated in FIG. 1B. The transaction number 192, an issuer number 194, and a check number 196 are clearly marked, but are shown for exemplary purposes only, and in no way limit the variations available for the alternative embodiments. A negotiable instrument 185 may also include information comprising a routing number, a check number, and an account number which is printed on the negotiable instrument with magnetic ink character recognition ("MICR") 198 technology. In some embodiments, when funds are allocated, they are no longer available for other uses. In such embodiments, therefore, the allocation may constitute a transfer of funds to the negotiable instrument. In other embodiments, the allocation may simply render the funds reserved for the instrument. Various other options are available as well.

The consumer may thereafter present the negotiable instrument to a merchant to settle a transaction. The merchant may interact with the host 106 to authorize the transaction, as will be explained in greater detail hereinafter.

Figure 2:
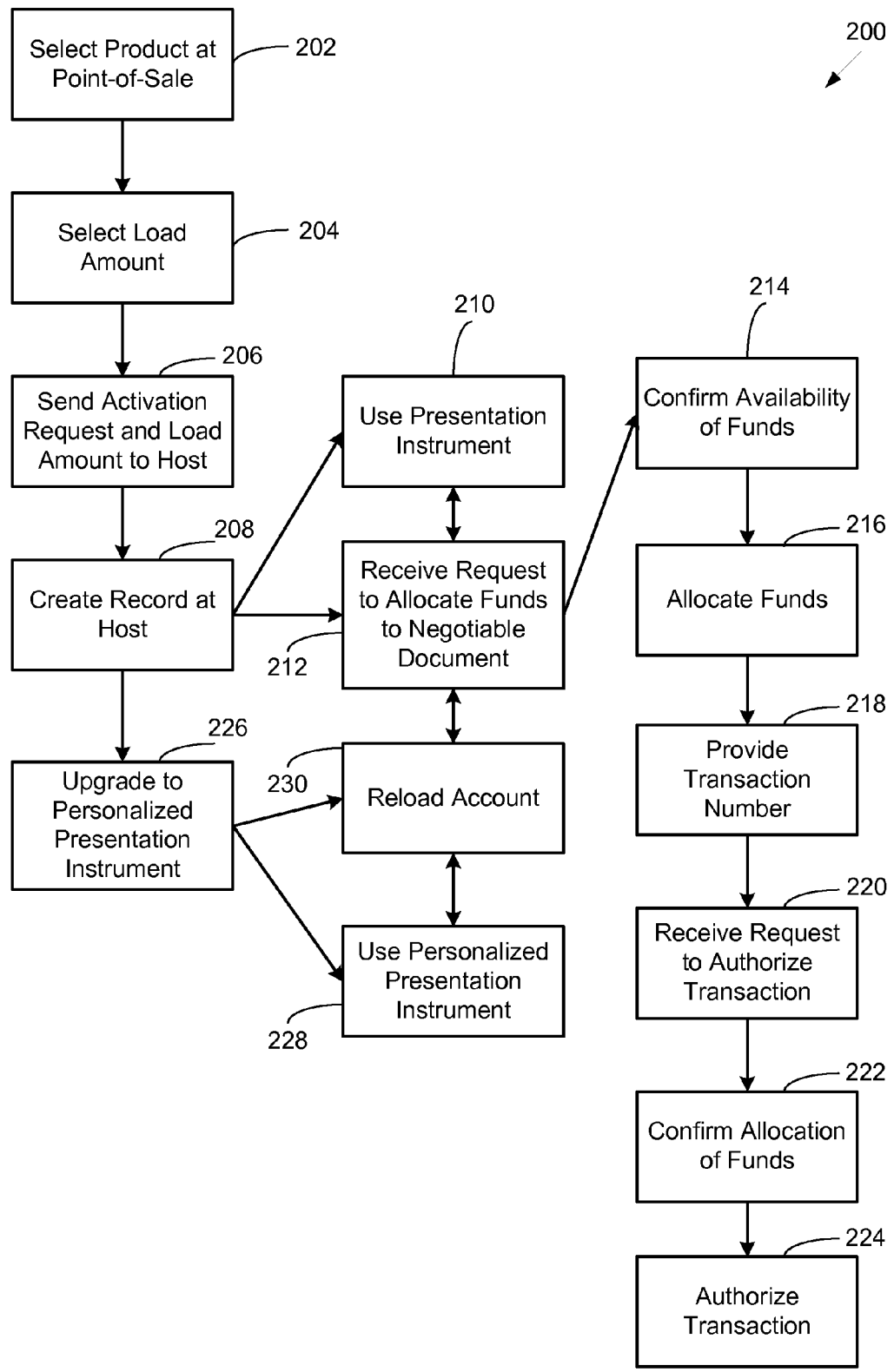
FIG. 2 illustrates an exemplary method according to embodiments of the invention, which method may be implemented in the system of FIG. 1A.

Having described an exemplary system 100 which may include embodiments of the invention, attention is directed to FIG. 2, which illustrates an exemplary method 200 according to embodiments of the invention. The method 200 may be implemented in the system 100 of FIG. 1A or other appropriate system. Those skilled in the art will appreciate that other method according to other exemplary embodiments may include more, fewer, or different steps than those illustrated and described herein. The method begins at block 202, at which a consumer selects a package for purchase at a point of sale. The package includes a presentation instrument and may include one or more negotiable instruments. FIGS. 3A-3C depict exemplary packaging systems, some of which include both presentation instruments and negotiable instruments and some of which include only presentation instruments.

The consumer presents the package for purchase at the point of sale and indicates an initial load amount (activation amount) to the attendant of the point of sale. The consumer provides the activation amount of funds to the attendant, typically in cash or cash equivalent. This takes place at block 204. The merchant location then, at block 206, communicates with a host computer system, using a point-of-sale device or other appropriate means. The communication comprises an activation request for the presentation instrument. The activation request includes an account identifier associated with the presentation instrument and the activation amount.

A record is created at the host computer system, which record includes the account identifier and activation amount. The record may pre-exist, pending the activation amount. The presentation instrument may have the account number, or a portion thereof, embossed thereon. This takes place at block 208.

In some embodiments the presentation instrument is immediately available for use, which may take place at block 210. In other embodiments, the consumer may be required to contact the operator of the host system to thereby complete an activation process. This may be accomplished at block 212 or block 226, as will be described.

At block 212, in embodiments in which the initial package purchased by the consumer included one or more negotiable instruments, the consumer contacts the operator of the host system to have funds allocated to a negotiable instrument. If the consumer has not already done so, the consumer may also complete activation of the account, if required. To fully activate the account, the consumer may be required to provide certain personal information. In some embodiments, the consumer also may "upgrade" the account to an account that allows additional deposits. In some embodiments, this amounts to converting a SVA account to a DDA account. Such account "porting" is more fully described in previously-incorporated U.S. patent application Ser. No. 11/834,457.

In allocating funds to a negotiable instrument, the consumer identifies an allocation amount. The negotiable instruments included in the package purchased by the consumer may be individually numbered. Hence, the consumer may need to identify a negotiable instrument to which the funds should be allocated. The host system confirms the availability of funds at block 214, and provided the funds are available, the amount is allocated to the negotiable instrument at block 216, thereby creating a negotiable instrument that cannot "bounce." The host system provides a transaction number to the consumer at block 218, which transaction number the consumer enters on the negotiable instrument.

At block 220, the host system receives a request to authorize a transaction. The request typically comes from a merchant (AKA service provider, etc.) to whom the consumer tendered the negotiable instrument in settlement of a transaction. The authorization request includes an identifier of the negotiable instrument and a transaction amount. The host confirms that the transaction amount matches (or at least does not exceed) the allocation amount. If so, the host system authorizes the transaction at block 224.

In some embodiments, the consumer may have the option to create a personalized presentation instrument account at block 226. This may be the same as activating the account described previously at block 212. This personalization step may result in the creation of a personally-embossed card for the consumer and/or the creation of an account to which the consumer and/or third parties may load additional value. This also may result in the consumer receiving negotiable instruments, which may or may not have been included in the original package. The consumer may then use the personalized presentation instrument at block 228 and load additional value to the presentation instrument at block 230.

Attention is now directed to FIGS. 3A-3C, which depict various packaging arrangements for presentation instruments and/or negotiable instruments according to embodiments of the present invention. FIG. 3A depicts a first exemplary embodiment of a package 300. A front (closed) view 302 and a back (open) view 304 are provided. Flaps conceal a presentations instrument 306 which is accessible once a packaging seal is broken. Although not pictured, the package 300 may include product identification, advertising, instructions, bar codes, and the like. The package 300 may be displayed for purchase using a typical J-hook display.

FIG. 3B depicts a second exemplary embodiment of a package 310. Front 312 and rear 314 views are provided. The package 310 includes a presentation instrument 316 and one or more negotiable instruments 318 according to embodiments of the present invention. Although visible, the presentation instrument 316 and negotiable instruments 318 may be inaccessible due to packaging or the like. Any embossing may be obscured or otherwise not visible.

FIG. 3C depicts a third exemplary embodiment of a package 320. Front (open) 322 and rear 324 views are provided. The package 320 includes a presentation instrument 326 and one or more negotiable instruments 328. Those skilled in the art will recognize a number of alternative embodiments in light of the disclosure herein.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be required before the above elements are considered. Accordingly, the above description should not be taken as limiting the scope of the invention, which is defined in the following claims.

What is claimed is:

1. A presentation instrument package, comprising:
a presentation instrument associated with an account; and
a physically separate fund on issue negotiable instrument associated with the account;
wherein:
the package, comprising both the presentation instrument and the physically separate fund on issue negotiable instrument, is configured for display at a point-of-sale,
the presentation instrument and negotiable instrument are configured for activation at the point-of-sale upon a customer's request to activate the account associated with the presentation instrument and the fund on issue negotiable instrument and to associate an amount of funds with the account, and
the fund on issue negotiable instrument is configured such that, upon an additional request from the customer, an allocation amount of funds is allocated to the fund on issue negotiable instrument from the activated account.

2. The package of claim 1, wherein the presentation instrument comprises a physical card and the negotiable instrument is a physical check.

3. The package of claim 2, wherein the physical card is a debit card.

4. The package of claim 1, further comprising packaging having instructions printed thereon for activating the account associated with the presentation instrument and the negotiable instrument.

5. The package of claim 4, wherein the account comprises a selection from a group comprising:
stored value account (SVA);
demand deposit account (DDA);
negotiable order of withdrawal account (NOW); and
for the benefit of account (FBO).

6. A method of creating an account for a customer, comprising:
creating an account;
providing a presentation instrument relating to the account;
providing a physically separate fund on issue negotiable instrument relating to the account, wherein the fund on issue negotiable instrument is allocated an amount of funds from the account upon a customer's request;
packaging together both the presentation instrument and the physically separate fund on issue negotiable instrument for display at a retail location;
upon request from a customer at the retail location, activating the account using a point-of-sale device by associating a customer-specified amount of funds with the account, wherein the customer tenders the amount of funds at the retail location;
receiving a subsequent request from the customer to allocate a portion of the amount of funds to the negotiable instrument; and
in response to the subsequent request, allocating the portion of the funds to the negotiable instrument, thereby preventing the portion of the funds from being used to settle a transaction not involving the negotiable instrument.

7. The method of claim 6, wherein the account comprises a selection from a group comprising:
stored value account (SVA);
demand deposit account (DDA);
negotiable order of withdrawal account (NOW); and
for the benefit of account (FBO).

8. The method of claim 6, wherein the presentation instrument comprises a debit card.

9. The method of claim 6, further comprising thereafter receiving a request from the customer to upgrade the presentation instrument to a personalized presentation instrument.

10. The method of claim 6, further comprising:
in response to a request to settle a transaction using the negotiable instrument, confirming that funds are available to settle the transaction; and
authorizing the transaction.

11. The method of claim 6, further comprising:
in response to a request to settle a transaction not using the negotiable instrument, confirming that funds are available to settle the transaction; and
denying the transaction.

12. A method of completing a purchase transaction, comprising:
at a point-of-sale, receiving a request from a customer to activate an account, wherein the request identifies an activation amount of funds to associate with the account;
using a point-of-sale device to send an account identifier and the activation amount of funds to a host computer system;
creating a record at the host computer system, wherein the record identifies the activation amount of funds;
at the point-of-sale, completing a transaction with the customer in which transaction the customer purchases a package that includes both a presentation instrument and at least one physically separate negotiable document relating to the account, wherein both the presentation instrument and the at least one negotiable document can be used to access the activation amount of funds associated with the account;
subsequently receiving a request at the host computer system to allocate an allocation amount of funds from the account to the at least one negotiable document;
confirming that the allocation amount of funds is less than a current balance of funds;
allocating the allocation amount of funds to the at least one negotiable document;
providing a transaction number in response to the request to allocate funds;
receiving a request from a merchant to authorize a transaction using the at least one negotiable document, wherein the request includes a transaction amount of funds;
comparing the allocation amount of funds to the transaction amount of funds; and
based on the comparison, authorizing the transaction.

13. The method of claim 12, wherein the presentation instrument comprises a debit card.

14. The method of claim 12, wherein the negotiable document comprises a fund on issue negotiable instrument for which funds are allocated to the negotiable instrument upon the customer's request prior to the customer presenting the negotiable instrument for settlement of a transaction.

15. The method of claim 12, wherein the account comprises a selection from a group comprising:
stored value account (SVA);
demand deposit account (DDA);
negotiable order of withdrawal account (NOW); and
for the benefit of account (FBO).

16. The method of claim 12, further comprising thereafter receiving a request from the customer to upgrade the presentation instrument to a personalized presentation instrument.

* * * * *